(12) United States Patent
Xiong et al.

(10) Patent No.: US 9,800,387 B2
(45) Date of Patent: Oct. 24, 2017

(54) COMPUTING APPARATUS WITH CROSS-SUBFRAME SCHEDULING

(71) Applicant: Intel IP Corporation, Santa Clara, CA (US)

(72) Inventors: Gang Xiong, Beaverton, OR (US); Marta Martinez-Tarradell, Hillsboro, OR (US); Debdeep Chatterjee, Mountain View, CA (US); Seunghee Han, Cupertino, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 57 days.

(21) Appl. No.: 14/711,701

(22) Filed: May 13, 2015

(65) Prior Publication Data
US 2016/0134403 A1    May 12, 2016

Related U.S. Application Data

(60) Provisional application No. 62/076,359, filed on Nov. 6, 2014.

(51) Int. Cl.
*H04W 4/00* (2009.01)
*H04L 5/00* (2006.01)
(Continued)

(52) U.S. Cl.
CPC .......... *H04L 5/0055* (2013.01); *H04L 1/0027* (2013.01); *H04L 1/1854* (2013.01);
(Continued)

(58) Field of Classification Search
None
See application file for complete search history.

(56) References Cited

U.S. PATENT DOCUMENTS

| | | |
|---|---|---|
| 2012/0129522 A1 | 5/2012 | Kim et al. |
| 2013/0143502 A1 | 6/2013 | Kazmi et al. |

(Continued)

FOREIGN PATENT DOCUMENTS

| | | |
|---|---|---|
| KR | 20170013316 A | 2/2017 |
| WO | 2013049768 A1 | 4/2013 |

(Continued)

OTHER PUBLICATIONS

International Search Report and Written Opinion for International Application No. PCT/US2015/054318 dated Jan. 4, 2016; 13 pages.

(Continued)

*Primary Examiner* — Bob Phunkulh
(74) *Attorney, Agent, or Firm* — Schwabe, Williamson & Wyatt, P.C.

(57) ABSTRACT

The present disclosure describes embodiments of apparatuses, systems, and methods for cross sub-frame by enhanced physical downlink control channel (EPDCCH) transmissions for scheduling of physical downlink share channel (PDSCH) transmissions one or more subframes after the EPDCCH transmission. Cross subframe scheduling may be useful for machine type communication (MTC) user equipment (UE) with reduced bandwidth support including half duplex type MTC UE operating at 1.4 MHz bandwidth.

21 Claims, 8 Drawing Sheets

(51) Int. Cl.
  *H04L 1/00* (2006.01)
  *H04L 1/18* (2006.01)
  *H04W 72/04* (2009.01)
  *H04W 72/12* (2009.01)
(52) U.S. Cl.
  CPC .......... *H04L 1/1887* (2013.01); *H04L 1/1896* (2013.01); *H04W 4/005* (2013.01); *H04W 72/0446* (2013.01); *H04W 72/1263* (2013.01)

(56) References Cited

U.S. PATENT DOCUMENTS

| | | | |
|---|---|---|---|
| 2013/0336156 A1 | 12/2013 | Wei et al. | |
| 2014/0023022 A1 | 1/2014 | Cheng et al. | |
| 2014/0031054 A1 | 1/2014 | Zou et al. | |
| 2014/0036818 A1 | 2/2014 | Koskela et al. | |
| 2014/0044056 A1 | 2/2014 | Chen et al. | |
| 2014/0098761 A1* | 4/2014 | Lee | H04W 74/006 370/329 |
| 2014/0105155 A1* | 4/2014 | Kim | H04L 1/1861 370/329 |
| 2014/0126491 A1* | 5/2014 | Ekpenyong | H04L 5/0055 370/329 |
| 2014/0161060 A1* | 6/2014 | Nam | H04L 5/0055 370/329 |
| 2014/0220970 A1 | 8/2014 | Yang et al. | |
| 2014/0307652 A1* | 10/2014 | Zhang | H04W 52/325 370/329 |
| 2014/0307690 A1* | 10/2014 | Kim | H04B 7/2656 370/329 |
| 2015/0009952 A1* | 1/2015 | Berggren | H04W 72/042 370/330 |
| 2015/0043473 A1* | 2/2015 | Kim | H04L 1/1812 370/329 |
| 2015/0071207 A1* | 3/2015 | Seo | H04W 76/023 370/329 |
| 2015/0365831 A1* | 12/2015 | Ko | H04L 5/0053 370/329 |
| 2016/0007350 A1 | 1/2016 | Xiong et al. | |
| 2016/0037514 A1 | 2/2016 | Xiong et al. | |
| 2016/0043849 A1* | 2/2016 | Lee | H04W 72/042 370/329 |
| 2016/0095076 A1 | 3/2016 | Xiong et al. | |
| 2016/0128055 A1 | 5/2016 | Xiong et al. | |

FOREIGN PATENT DOCUMENTS

| | | | |
|---|---|---|---|
| WO | 2013149390 A1 | 10/2013 | |
| WO | 2013174263 A1 | 11/2013 | |
| WO | 2014109684 A1 | 7/2014 | |
| WO | 2014113095 A1 | 7/2014 | |
| WO | 2016018526 A1 | 2/2016 | |
| WO | 2016048519 A1 | 3/2016 | |

OTHER PUBLICATIONS

Gang Xiong et al., "Enhanced Node B (ENB) and Method for MTC Coexistence," from U.S. Appl. No. 14/667,430, filed Mar. 24, 2015.
Ericsson, Nokia Networks, "New WI proposal: Further LTE Physical Layer Enhancements for MTC," 3GPP TSG RAN Meeting #65, Agenda Item 141.1, RP-141660, Edinburgh, Scotland, Sep. 9-12, 2014, 9 pages.
International Search Report and Written Opinion for International Application No. PCT/US2015/036706 dated Nov. 4, 2015; 10 pages.
ZTE; "SIB Coverage Improvement for MTC UEs," Agenda Item: 7.2.2.2.1; 3GPP TSG RAN WG1 Meeting #76, R1-140281; Prague, Czech Republic, Feb. 10-14, 2014; 5 pages.
Intel Corporation; "Remaining issues for low cost MTC UE," Agenda Item: 6.2.2.1; 3GPP TSG-RAN WG1 #77, R1-142024; Seoul, Korea, May 19-23, 2014; 7 pages.
Huawei, Hisilicon; "Discussion on the resource allocation for low cost MTC UEs," Agenda Item: 7.2.2.1; 3GPP TSG RAN WG1 Meeting #76bis, R1-141119; Shenzhen, China, Mar. 31-Apr. 4, 2014; 3 pages.
Ericsson, NSN; "On Reduced UE Bandwidth and Enhanced Coverage for MTC," Agenda Item: 6.2.2.3, R1-142541; 3GPP TSG-RAN WG1 Meeting #77; Seoul, Korea, May 19-23, 2014; 2 pages.
3GPP TR 36.888 V2.1.1 (Jun. 2013); Technical Specification Group Radio Access Network; Study on provision of low-cost MTC UEs based on LTE; (Release 12); 55 pages.
International Search Report and Written Opinion dated Jan. 8, 2016 for International Application No. PCT/US2015/054089; 17 pages.
3GPP TS 36.211 V11.6.0 (Sep. 2014); "Technical Specification Group Radio Access Network; Evolved Universal Terrestrial Radio Access (E-UTRA); Physical channels and modulation (Release 11)," 120 pages.
U.S. Office Action issued for U.S. Appl. No. 14/692,510 dated Dec. 30, 2016; 46 pages.
International Search Report and Written Opinion for International Application No. PCT/US2015/036706 dated Jun. 19, 2015; 12 pages.
International Search Report and Written Opinion for International Application No. PCT/US2015/046548 dated Dec. 28, 2015; 14 pages.
International Search Report and Written Opinion for International Application No. PCT/US2015/034958 dated Sep. 22, 2015; 13 pages.
ZTE; "SIB Coverage Improvement for MTC UEs," 3GPP TSG RAN WG1 Meeting #76, R1-140281, Agenda Item: 7.2.2.2.1; Prague, Czech Republic, Feb. 10-14, 2014; 5 pages.
Media Tek Inc.; "On the need of PDCCH for SIB, RAR and Paging," 3GPP TSG-RAN WG1 #76, R1-140239, Agenda Item: 7.2.2.2.3; Prague, Czech Republic, Feb. 10-14, 2014; 4 pages.
Intel Corporation; "Remaining issues for low cost MTC UE," 3GPP TSG-RAN WG1 #77, R1-142024, Agenda item: 6.2.2.1; Seoul, Korea, May 19-23, 2014; 7 pages.
Huawei, Hisilicon; "Discussion on the resource allocation for low cost MTC UEs," 3GPP TSG RAN WG1 Meeting #76bis, R1-141119, Agenda Item: 7.2.2.1; Shenzhen, China, Mar. 31-Apr. 4, 2014; 3 pages.
Ericsson, NSN; "On Reduced UE Bandwidth and Enhanced Coverage for MTC," 3GPP TSG-RAN WG1 Meeting #77, R1-142541, Agenda item: 6.2.2.3; Seoul, Korea, May 19-23, 2014; 2 pages.
3GPP TR 36.888 V2.1.1 (Jun. 2013); "Technical Specification Group Radio Access Network; Study on provision of low-cost MTC UEs based on LTE (Release 12)," Jun. 20, 2013; 55 pages.
U.S. Office Action for U.S. Appl. No. 14/693,653 dated Apr. 12, 2017; 24 pages.
U.S. Office Action for U.S. Appl. No. 14/693,653 dated Aug. 11, 2016; 27 pages.
Korean Patent Office; Office Action issued for Patent Application No. 10-2016-7033401 dated on Aug. 17, 2017; 11 pages.

* cited by examiner

COMPUTING APPARATUS WITH CROSS-SUBFRAME SCHEDULING

CROSS-REFERENCE TO RELATED APPLICATIONS

The present application claims priority to U.S. Provisional Patent Application No. 62/076,359, filed Nov. 6, 2014, entitled "EPDCCH-Based DL Control Channel with Cross-Subframe Scheduling for MTC UEs with Reduced BW Support," the entire disclosure of which is hereby incorporated by reference herein in its entirety for all purposes.

FIELD

Embodiments of the present disclosure generally may relate to the field of wireless communications. More specifically, embodiments of the present disclosure generally may relate to physical download control channel scheduling for wireless communications in wireless communication devices, systems, and methods.

BACKGROUND

Machine-Type Communication (MTC) is a promising and emerging technology to enable a ubiquitous computing environment towards the concept of "Internet of Things." Potential MTC-based applications include smart metering, healthcare monitoring, remote security surveillance, intelligent transportation system, etc. These services and applications may stimulate the design and development of a new type of MTC device that may be seamlessly integrated into current and next generation mobile broadband networks such as LTE and LTE-Advanced.

The existing mobile broadband networks were designed to optimize performance mainly for human-type communications and thus are not generally designed or optimized to meet MTC related requirements. MTC specific design are being studied by Third Generation Partnership Project (3GPP) Radio Access Network (RAN) working groups (WGs) for specification support in Release-12 LTE specifications. The studies are focused on lower MTC device cost, enhanced coverage for MTC devices, and reduced power consumption of MTC devices.

To further reduce cost and power consumption, MTC device bandwidth may be 1.4 MHz for uplink and downlink. This value is the minimum bandwidth for an LTE system, which has bandwidths of 20, 15, 10, 5, 3, and 1.4 MHz in the specifications. In some embodiments for MTC devices, the transmission bandwidth for both control and data channels may be 1.4 MHz. Generally, a large number of MTC devices may be deployed for specific services within one cell. When a large number of MTC devices attempt to access and communicate within a network, multiple MTC regions with a 1.4 MHz bandwidth may be allocated by an eNB.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
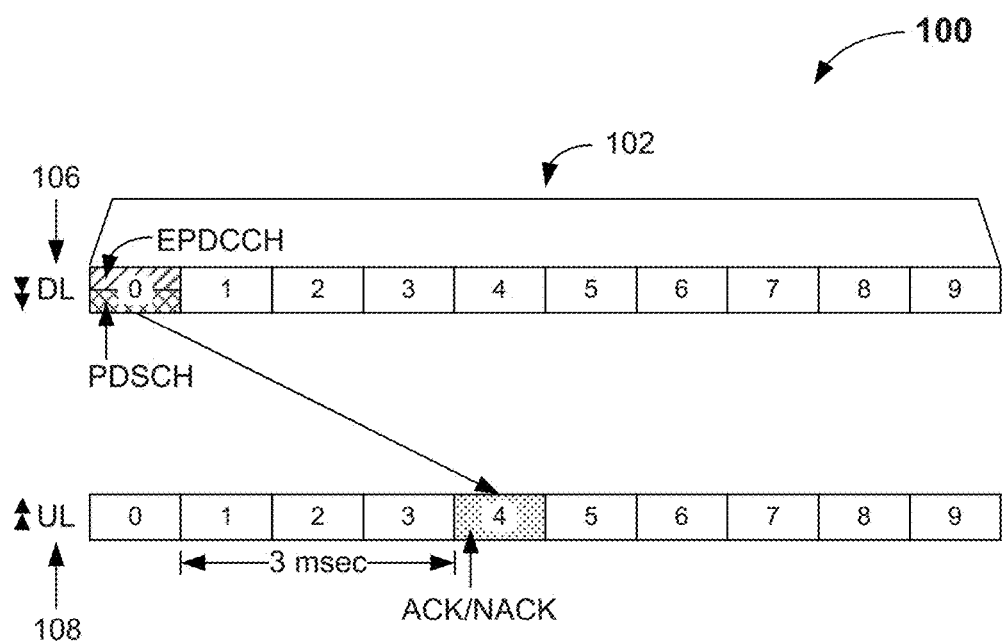
FIG. 1 illustrates a radio frame schedule with a radio frame with 0-9 subframes for downlink (DL) and uplink (UL,) where an enhanced physical downlink control channel (EPDCCH) transmission is in subframe 0 and has scheduling information for a physical downlink shared channel (PDSCH) transmission in subframe 0 (no cross-subframe scheduling) and where acknowledgement/non-acknowledgement (ACK/NACK) feedback is reported four subframes after the EPDCCH transmission.

Embodiments of the present disclosure describe apparatuses and methods for LTE frame timing and structures related to enhanced physical control channel-based downlink control channel with cross-subframe scheduling for machine type user equipment devices with reduced bandwidth support, including associated techniques and configurations. In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrases "A or B" and "A and/or B" mean (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" by one or more network linkages.

As used herein, the term "circuitry" may refer to, be part of, or include an Application Specific Integrated Circuit (ASIC), an electronic circuit, a field programmable device such as a field programmable gate array (FPGA), a system-on-chip (SoC), a processor (shared, dedicated, or group), and/or memory (shared, dedicated, or group) that execute one or more software or firmware programs, a combinational logic circuit, and/or other suitable components that provide the described functionality.

The term LTE refers to long term evolution and may include LTE advanced. The term UE refers to user equipment and may include mobile and fixed devices, including devices for voice and/or data. The term MTC device may include MTC UE. The term eNB refers to an evolved node B, which may be referred to as a base station in a cellular system. The term DL refers to downlink, and the term UL refers to uplink.

The term "logic" or "computer logic" includes software and/or hardware implementations of logical operations on data. Logic in a hardware implementation may include a computer switching circuit that consists of a number of logic gates and performs logical operations on data. Logic in a software implementation may include software code that performs the logical functions of a number of logic gates and performs logical operations on data.

To achieve seamless coexistence with legacy LTE systems, several options may be considered in the design of control channels for unicast transmission. For example, either narrowband physical download control channel (PDCCH) or existing enhanced-PDCCH (EPDCCH) may be used for MTC UEs operating at reduced bandwidth of 1.4 MHz.

With respect to EPDCCH transmissions, cross-subframe scheduling may be used to reduce a buffer size that is used to store orthogonal frequency division multiplexing (OFDM) symbols for PDSCH transmission. This reduced buffer size may provide reduced cost savings for MTC UE's implementing embodiments with this feature. Cross-subframe scheduling by EPDCCH transmission may be scheduling of a PDSCH transmission in the next subframe or two or three subframes after the subframe with EPDCCH providing the scheduling of the PDSCH.

In some embodiments, HARQ operation may be improved for (1) MTC UEs with reduced UE bandwidth support and (2) MTC UEs with reduced UE bandwidth support and half-duplex (HD) frequency division duplex (FDD) operation mode. HD operation may be on the UE side only. Some embodiments may include methods and devices for scheduling and receiving system information block (SIB) and paging messages at MTC UEs with reduced UE BW using DL control channel based on EPDCCH with cross-subframe scheduling.

Some embodiments of methods, devices, and systems may include embodiments of (1) a DL hybrid automatic repeat request (HARQ) timing embodiment for EPDCCH-based cross-subframe scheduling for MTC UEs with reduced BW support; (2) a DL HARQ timing embodiment for EPDCCH with cross-subframe scheduling for HD-FDD operation for MTC UEs with reduced BW support; (3) processes to receive SIB1 at MTC UEs with reduced BW support scheduled by EPDCCH with cross-subframe scheduling; (4) processes to receive SIBx (x is greater than or equal to 2) at MTC UEs with reduced BW support scheduled by EPDCCH with cross-subframe scheduling; and (5) processes to receive paging messages at MTC UEs with reduced BW support scheduled by EPDCCH with cross-subframe scheduling.

In some embodiments, DL HARQ timing for MTC UEs with reduced bandwidth support may be reduced when EPDCCH schedules PDSCH in a different subframe from the subframe with EPDCCH scheduling the PDSCH data. In other words, cross-subframe scheduling may be provided by EPDCCH, which schedules PDSCH data for an MTC UE in a different subframe, where the different subframe may be one or two subframes after the subframe with the EPDCCH. In some embodiments, a DL HARQ timing and UE response method in LTE specifications may be used when PDSCH is scheduled by EPDCCH where the PDSCH is scheduled with cross-subframe scheduling.

In some embodiments, the MTC UE with reduced bandwidth support, which may be referred to as MTC UE, may report HARQ-ACK feedback in subframe n for a PDSCH cross subframe transmission that may be indicated by the detection of a corresponding EPDCCH transmission in subframe n−4 or for an EPDCCH transmission indicating downlink semi-persistent scheduling (SPS) release in subframe n−4. By way of example of EPDCCH scheduling that is not cross-subframe scheduling, FIG. 1 illustrates a radio frame schedule 100 with a radio frame 102 with 0-9 subframes for downlink 106 (DL) and uplink 108 (UL,) where an enhanced physical downlink control channel (EPDCCH) transmission is in subframe 0 and has scheduling information for a physical downlink shared channel (PDSCH) transmission in subframe 0 (no cross-subframe scheduling) and where acknowledgement/non-acknowledgement (ACK/NACK) feedback is reported four subframes after the EPDCCH transmission. In frame scheduling 100, the feedback time is shown as subframes 1, 2, and 3 providing a total of 3 ms since each subframe is 1 ms.

In some embodiments, a UE may transmit HARQ-ACK feedback (e.g., a report of ACK/NACK) in UL subframe 'n' in response to a PDSCH transmission that was scheduled (at least) for a specific UE, with the scheduling information being carried by the EPDCCH transmitted in DL subframe 'n−4'. So, even though EPDCCH may be transmitted in each subframe at the system level and the UE may be expected to monitor for EPDCCH transmissions on the DL in every subframe, the HARQ-ACK response may be transmitted by the UE only for the PDSCH transmissions intended for a specific UE, where the PDSCH transmissions may be scheduled in the same or different subframes from the EPDCCH transmission.

In some embodiments, for cross-subframe scheduling for the DL, the PDSCH may be transmitted one subframe after the reception of the PDSCH scheduling assignment via the EPDCCH-based DL control channel transmission, resulting in shorter time available at the UE to process the PDSCH and generate HARQ-ACK feedback (from 3 ms to 2 ms in FDD systems where PDSCH is scheduled one subframe later). In some embodiments, the processing time may be the same for PDSCH processing at the MTC UEs as non-MTC UEs in current LTE specifications. In the current specifications for LTE, cross-subframe scheduling is not supported, and hence, EPDCCH in subframe 'n−4' schedules the PDSCH in the same subframe 'n−4', and the UE transmits the corresponding HARQ-ACK in UL subframe 'n'.

In some embodiments with cross-subframe scheduling, the EPDCCH in subframe 'n−4' may schedule the PDSCH in subframe 'n−3' (assuming EPDCCH schedules PDSCH for the next subframe). However, EPDCCH may schedule PDSCH for the next m-th subframe, e.g., m=2 instead of 1. If the same time-line for HARQ-ACK feedback as is currently specified (and proposed to be reused as one alternative in this disclosure) is maintained, then the UE gets 1 subframe worth of time less with cross-subframe scheduling compared to same-subframe scheduling for processing of the PDSCH transport block. Specifically, the processing time would be 2 ms instead of 3 ms for one subframe cross scheduling. The currently specified time gap between the scheduling EPDCCH (and PDSCH) and the HARQ-ACK feedback of 4 ms includes 3 ms of processing time, wherein the remaining 1 ms may be to accommodate a timing advance to compensate for a propagation delay between a cell-edge UE and the serving cell in a cellular deployment. In some embodiments, a cellular deployment may be about a 100 km radius. In some embodiments, a support cell radius may be for an LTE design.

Regarding the timing between PDSCH and the HARQ-ACK feedback, for legacy operation (as in current specifications), the timing may be the same as between the scheduling EPDCCH and HARQ-ACK feedback, e.g., 4 subframes in FDD systems. With cross-subframe scheduling and legacy timing relationship between the scheduling EPDCCH and HARQ-ACK feedback, the gap between PDSCH and HARQ-ACK feedback would be (4−m) subframes where the cross-subframe scheduling is such that the EPDCCH in the $k^{th}$ subframe schedules the PDSCH in the $(k+m)^{th}$ subframe (e.g., 3 ms when m=1). In some embodiments, the timing relationship is consistent with the current specifications by referring to the time-gap between the scheduling EPDCCH (or EPDCCH indicating SPS release) and the corresponding HARQ-ACK feedback. The role of EPDCCH is that it carries all Layer 1 control information for the MTC UEs with reduced BW support. These UEs cannot receive the legacy PDCCH due to their supported Tx-Rx BW being limited to 1.4 MHz only while the legacy PDCCH is transmitted in a wideband manner spanning the entire system BW that can be greater than 1.4 MHz. Hence, at least as far as the DL HARQ timing is concerned, the EPDCCH carries all dynamic scheduling information for DL and UL data transmissions on the shared channels, PDSCH and PUSCH.

Figure 2:
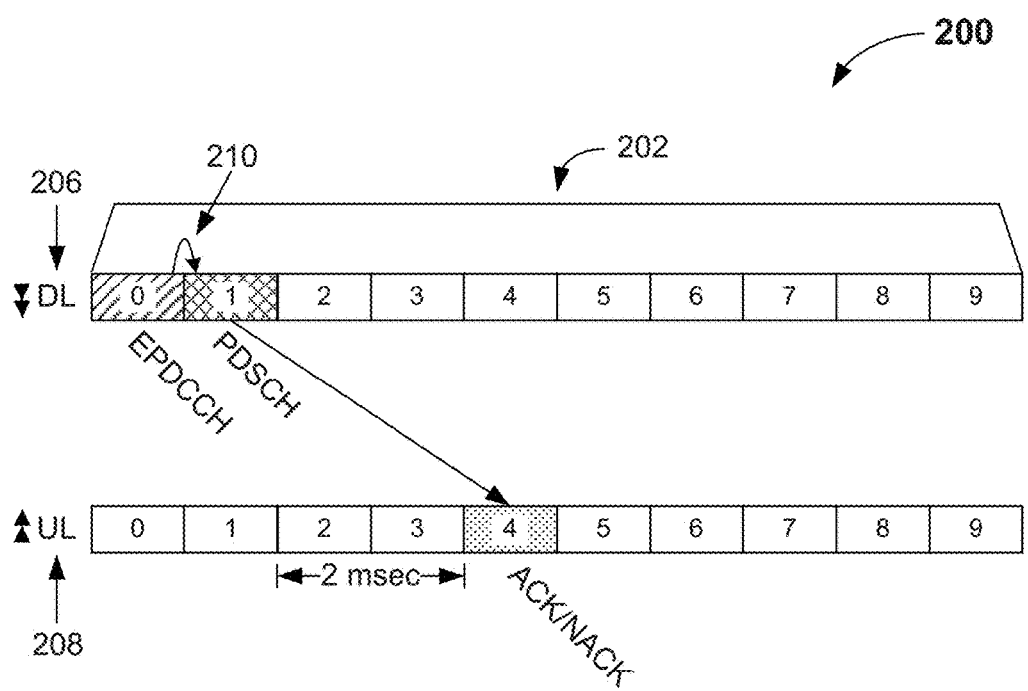
FIG. 2 illustrates frame scheduling with a radio frame with 0-9 subframes for DL and UL, where an EPDCCH transmission is in subframe 0 and schedules a PDSCH transmission in subframe 1 and where ACK/NACK feedback is reported four subframes after the EPDCCH transmission, in accordance with some embodiments.

In some embodiments, an MTC UE with reduced bandwidth support reports HARQ-ACK feedback in subframe n for a PDSCH transmission indicated by the detection of a corresponding EPDCCH in subframe n−4, or for an EPDCCH indicating downlink SPS release in subframe n−4. By way of example, FIG. 2 illustrates frame scheduling 200 with a radio frame 202 with 0-9 subframes for DL 206 and UL 208, where an EPDCCH transmission is in subframe 0 and schedules 210 a PDSCH transmission in subframe 1 and where ACK/NACK feedback is reported four subframes after the EPDCCH transmission, in accordance with some embodiments. In LTE frame scheduling 200, the feedback time is shown as subframes 2 and 3 providing a total of 2 ms since each subframe is 1 ms.

Figure 3:
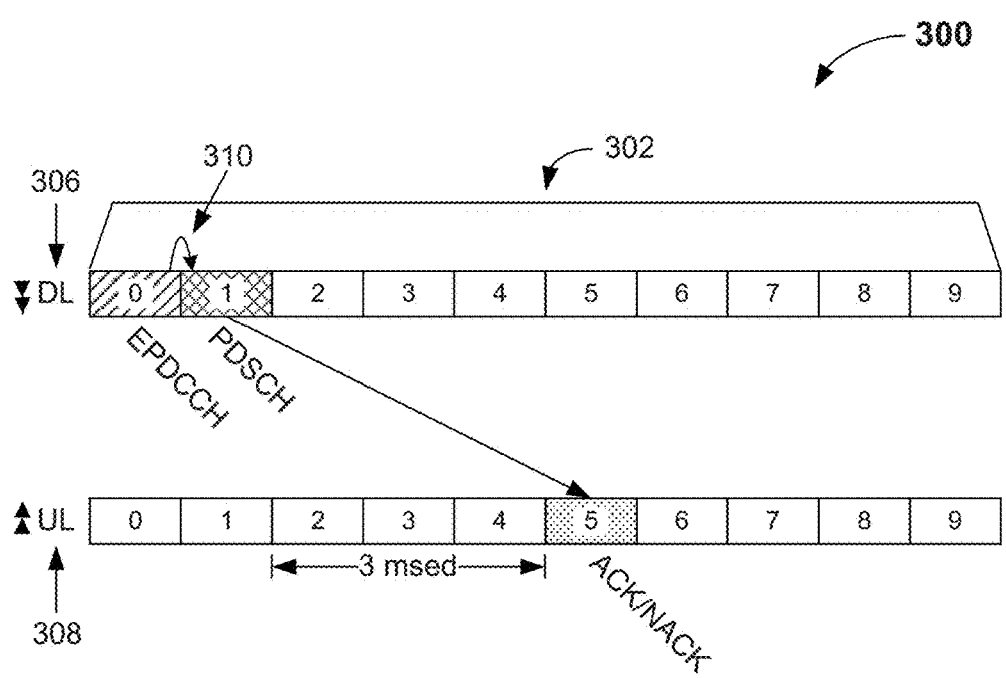
FIG. 3 illustrates frame scheduling with a radio frame with 0-9 subframes for DL and UL, where an EPDCCH transmission is in subframe 0 and schedules a PDSCH transmission in subframe 1 and where ACK/NACK feedback is reported five subframes after the EPDCCH transmission, in accordance with some embodiments.

In some embodiments, an MTC UE with reduced bandwidth support reports HARQ-ACK feedback in subframe n for a PDSCH transmission indicated by the detection of a corresponding EPDCCH in subframe n−5, or for an EPDCCH indicating downlink SPS release in subframe n−5. By way of example, FIG. 3 illustrates frame scheduling 300 with a radio frame 302 with 0-9 subframes for DL 306 and UL 308, where an EPDCCH transmission is in subframe 0 and schedules a PDSCH transmission in subframe 1 and where ACK/NACK feedback is reported five subframes after the EPDCCH transmission, in accordance with some embodiments. In frame scheduling 300, the feedback time is shown as subframes 2, 3 and 4 providing a total of 3 ms since each subframe is 1 ms.

In some embodiments, within a 1.4 MHz bandwidth system, a PUCCH region may be shared between regular UEs and MTC UEs with reduced BW support. Some embodiments of the DL HARQ timing for MTC UEs disclosed herein may result in resource collisions between regular non-MTC and MTC UEs with reduced BW. In some embodiments, collisions may be avoided by using UE-specific PUCCH starting offset and ACK-NACK Resource Offset (ARO) that are currently defined for derivation of PUCCH resources from EPDCCH-based DL control channel transmission. In some embodiments, an MTC UE-common region may be defined to separate PUCCH resources between regular non-MTC UEs and MTC UEs via defining a new PUCCH starting offset $N^{(1)}_{PUCCH\_MTC}$.

In some embodiments, EPDCCH with cross-subframe scheduling may be used for half duplex frequency division duplex (HD-FDD) operation. In some embodiments, cost and/or complexity of MTC devices may be reduced by implementing HD-FDD embodiments in such devices. In Rel-12 MTC Work Item (WI,) it was defined that the transition time between UL and DL can be up to 1 ms (1 subframe) if single oscillator is used for low cost MTC UE. When EPDCCH with cross-subframe scheduling is adopted for MTC UEs with reduced bandwidth support, HARQ procedure for the support of HD-FDD operation may be updated.

Figure 4:
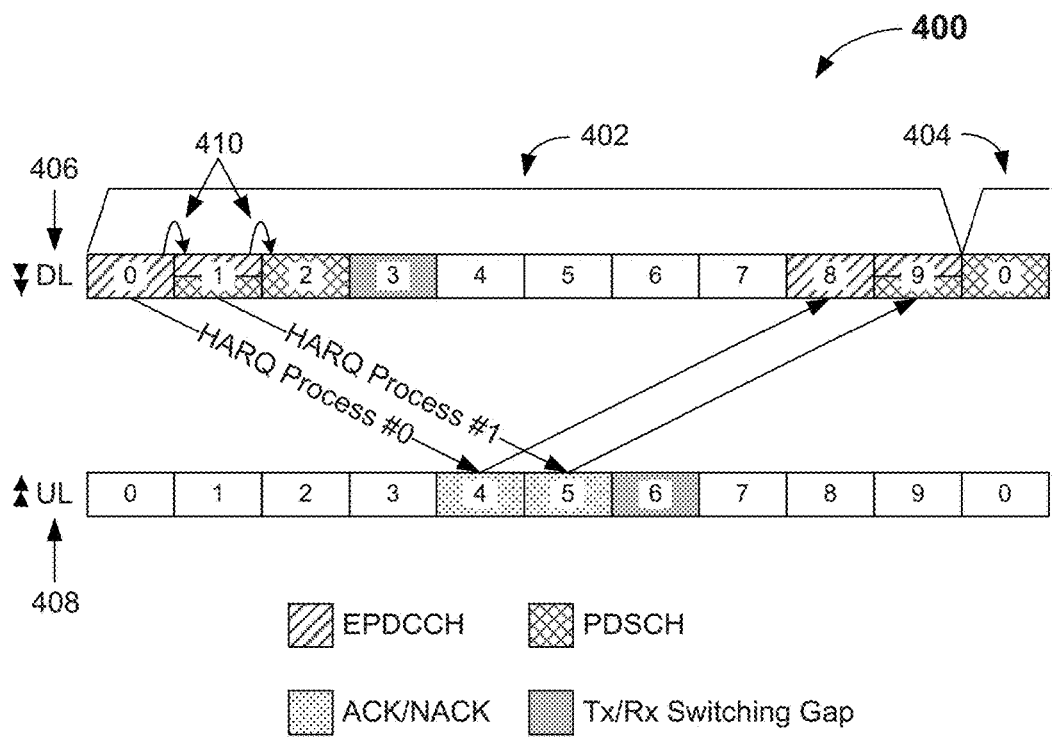
FIG. 4 illustrates frame scheduling with a radio frame schedule of an example of two hybrid automatic repeat request (HARQ) procedures with cross-subframe PDSCH scheduling with seven subframes between EPDCCH transmissions for a user equipment (UE) with half duplex-frequency division duplex (HD-FDD) operation, in accordance with some embodiments.

FIG. 4 illustrates frame scheduling 400 with a radio frame schedule 410 of an example of two hybrid automatic repeat request (HARQ) procedures with cross-subframe PDSCH scheduling 410 with seven subframes between EPDCCH transmissions for a user equipment (UE) with half duplex-frequency division duplex (HD-FDD) operation, in accordance with some embodiments. Frame 402 has subframes 0-9. Subsequent frame 404 has only subframe 0 shown. eNB downlink is shown as DL 406, and UE uplink (HD) is shown as UL 408. Cross-frame scheduling 410 by EPDCCH may be across subframes 0 to 1, 1 to 2, and/or 0 to 2. In FIG. 4, it can be seen that for HARQ process #0 in frame 402, EPDCCH may be transmitted in subframe 0 and the corresponding PDSCH may be transmitted in subframe 1 as cross-subframe 410 scheduling. ACK/NACK feedback, corresponding to data transmitted in PDSCH of subframe 1 (and scheduled in EPDCCH transmitted in subframe 0), may be transmitted in subframe 4 either on PUCCH or PUSCH. If NACK is received by eNB, EPDCCH, which may be used to schedule the retransmission, may be transmitted in subframe 8, while the corresponding PDSCH retransmission may be transmitted in subframe 9.

A similar process may also be applied for HARQ process #1, as shown in FIG. 4. For HARQ process #1, EPDCCH may be transmitted in subframe 1, and the corresponding PDSCH may be transmitted in subframe 2 as cross-subframe 410 scheduling. ACK/NACK feedback, corresponding to data transmitted in PDSCH of subframe 2 (and scheduled in EPDCCH transmitted in subframe 1), may be transmitted in subframe 5 either on PUCCH or PUSCH. If NACK is received by eNB, EPDCCH, which may be used to schedule the retransmission, may be transmitted in subframe 9, while the corresponding PDSCH retransmission may be transmitted in subframe 0 of frame 404. In some embodiments, a 1 ms Tx/Rx switching gap time may be inserted in subframe 3 and subframe 6 or subframe 7 as shown in FIG. 4. In some embodiments, the number of HARQ processes for EPDCCH with cross-subframe scheduling may be limited to two within a frame, where PDSCH may be scheduled one subframe after the frame with the EPDCCH.

Figure 5:
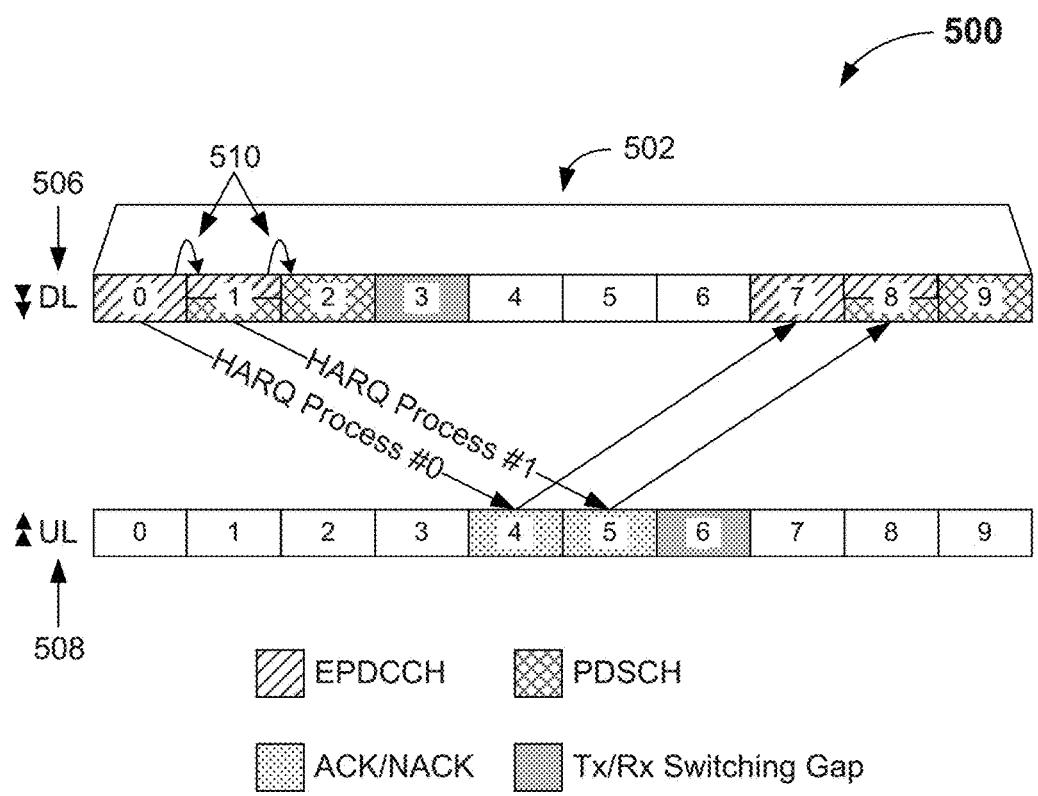
FIG. 5 illustrates frame scheduling with a radio frame schedule of an example of two HARQ procedures with cross-subframe PDSCH scheduling with six subframes between EPDCCH transmissions for a UE with HD-FDD operation, in accordance with some embodiments.

FIG. 5 illustrates frame scheduling 500 with a radio frame schedule of an example of two HARQ procedures with cross-subframe PDSCH scheduling with six subframes between EPDCCH transmissions for a UE with HD-FDD operation, in accordance with some embodiments. Frame 502 has subframes 0-9. eNB downlink is shown as DL 506, and UE uplink (HD) is shown as UL 508. Cross-frame scheduling 510 by EPDCCH may be across subframes 0 to 1, 1 to 2, and/or 0 to 2. In the FIG. 5, the gap between initial EPDCCH transmission and ACK/NACK feedback may be the same as shown in FIG. 4. However, the gap between the ACK/NACK feedback and subsequent EPDCCH used to schedule the PDSCH may be 2 ms in the embodiment of FIG. 5. This reduced gap may help to reduce the HARQ round trip time (RTT) from 9 ms in FIG. 4 to 8 ms in FIG. 5. Similarly, the number of HARQ processes for EPDCCH with cross-subframe scheduling may be limited to two for the embodiment of FIG. 5.

Figure 6:
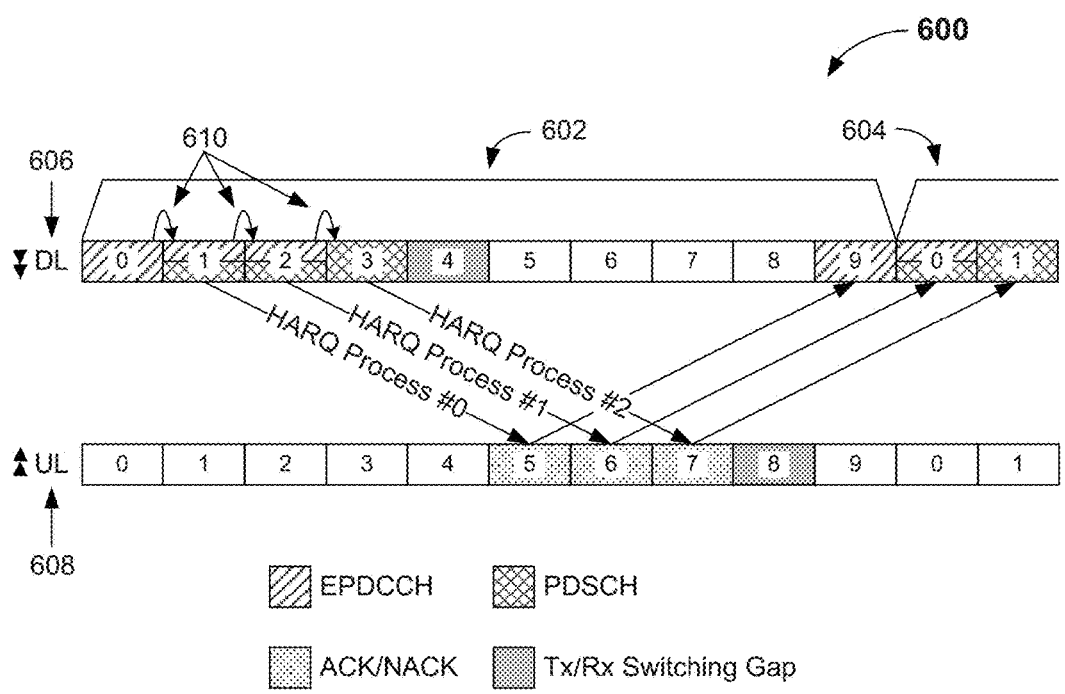
FIG. 6 illustrates frame scheduling with a radio frame schedule of an example of three HARQ procedures with cross-subframe PDSCH scheduling with seven subframes between a PDSCH transmission and a responsive EPDSCH transmission for a UE with HD-FDD operation, in accordance with some embodiments.

FIG. 6 illustrates frame scheduling 600 with a radio frame schedule of an example of three HARQ procedures with cross-subframe PDSCH scheduling with seven subframes between a PDSCH transmission and a responsive EPDSCH transmission for a UE with HD-FDD operation, in accordance with some embodiments. Frame 602 has subframes 0-9. Subsequent frame 604 has only subframes 0 and 1 shown. eNB downlink is shown as DL 606, and UE uplink (HD) is shown as UL 608. Cross-frame scheduling 610 by EPDCCH may be across subframes 0 to 1, 1 to 2, 2 to 3, 0 to 2, 0 to 3, and/or 1 to 3. In FIG. 6, the gap between EPDCCH used to schedule the initial transmission and ACK/NACK feedback may be 5 ms. In this embodiment, the gap between the ACK/NACK feedback and EPDCCH used to schedule the retransmission may be 4 ms. This indicates that the HARQ RTT in this example may be 9 ms. In the embodiment of FIG. 6, the number of HARQ processes for EPDCCH with cross-subframe scheduling may be limited to three.

In some embodiments, EPDCCH with cross-subframe scheduling may be used for scheduling of common control channels. For scheduling of System Information Block (SIB) or paging transmissions, if EPDCCH with cross-subframe scheduling is used for MTC UEs, the time when the UE receives the transmission of EPDCCH carrying scheduling assignments may be specified according to embodiments herein. In some embodiments, system information block type 1 (SIB1) may be scheduled according to embodiments herein.

In some embodiments for SIB1 transmission, EPDCCH with the scheduling assignment for the PDSCH carrying the SIB1 may be transmitted in subframe 4 or subframe 5 of a radio frame. In embodiments where SIB1 is transmitted in subframe 4 or subframe 5, this scheduling may benefit eNB scheduling because a common SIB1 transmission may be received by both non-MTC UEs and MTC UEs with reduced bandwidth on the same subframe (subframe 4 or subframe 5).

In some embodiments for SIBx (x is equal to or greater than 2) transmission, EPDCCH with the scheduling assignment for the PDSCH carrying the SIB1 may be transmitted in subframe 4 or subframe 5 of a radio frame. According to current specifications, information on the time-domain scheduling for the other SIBs is conveyed via the SIB1. This provides the UE with the information on the subframe locations, referred to as System Information (SI)-windows, when the UE could expect PDCCH transmission with the scheduling assignment for the PDSCH carrying SIBx (x≥2) as well as the PDSCH transmission itself.

For the case of scheduling of PDSCH transmissions carrying SIBx (x≥2) via EPDCCH with cross-subframe scheduling, in one embodiment of the present disclosure, which may be referred to as embodiment #A1, the time-domain scheduling information carried in SIB1 may be re-defined to indicate the subframe locations where the MTC UE may expect transmission of the EPDCCH carrying the scheduling assignment, with the actual PDSCH transmission carrying the SIBx (x≥2) on a subsequent subframe. In another embodiment, which may be referred to as embodiments #B1, the MTC UEs may expect that a PDSCH transmission carrying the SIBx (x≥2) may be transmitted within the SI-window indicated for the particular SIBx in the SIB1 message, wherein the MTC UE may monitor the subframes that occur k subframe(s) before the subframes spanning the SI-window indicated in the SIB1 message to receive the EPDCCH transmission with the scheduling assignment for the PDSCH transmission. The time gap of k subframes between the scheduling EPDCCH and the PDSCH carrying the SIBx (x≥2) may be fixed to a pre-defined value, or indicated in the Master Information Block (MIB) carried in the PBCH, or, for the case of Embodiment #A1 above, dynamically signaled in the EPDCCH. In some embodiments, the actual PDSCH transmission carrying the SIBx occurs on the immediately following subframe.

In some embodiments, paging messages may be scheduled in embodiments of radio frame scheduling disclosed herein. In some embodiments of scheduling of paging transmissions, which may be referred to as embodiment #A2, an EPDCCH transmission carrying the scheduling assignment may be transmitted during the paging occasion (PO) where the scheduled PDSCH carrying the paging message may be transmitted on a subsequent subframe. This may ensure that the UE wakes up at the PO to first receive the EPDCCH transmission. In another embodiment, which may be referred to as embodiment #B2, the PDSCH carrying the paging message is transmitted during the PO as per existing specifications but the MTC UE may be specified to wake up k subframe(s) before the PO to receive the EPDCCH with the scheduling assignment for the PDSCH. In some embodiments, the time gap of k subframes between the scheduling EPDCCH and the PDSCH carrying the paging message may be fixed to a pre-defined value, or indicated in the Master Information Block (MIB) carried in the physical broadcast channel (PBCH,) or, for the case of embodiment #A2 above, dynamically signaled in the EPDCCH. In some embodiments, the actual PDSCH transmission carrying the paging message may occur on the immediately following subframe. In some embodiments, the time gap of k subframes between the scheduling EPDCCH and the PDSCH carrying the paging message may be set by a specification issued by a standards body such as 3GPP.

Although the description of the embodiments herein assumes no repeated transmissions, a person having ordinary skill in the art would readily understand that the various embodiments may be straightforwardly applied to the case of repeated transmissions, for instance, by aligning the proposed timing relationships between the last repetition subframe of the scheduling EPDCCH and the first repetition subframe of the scheduled PDSCH.

Figure 7:
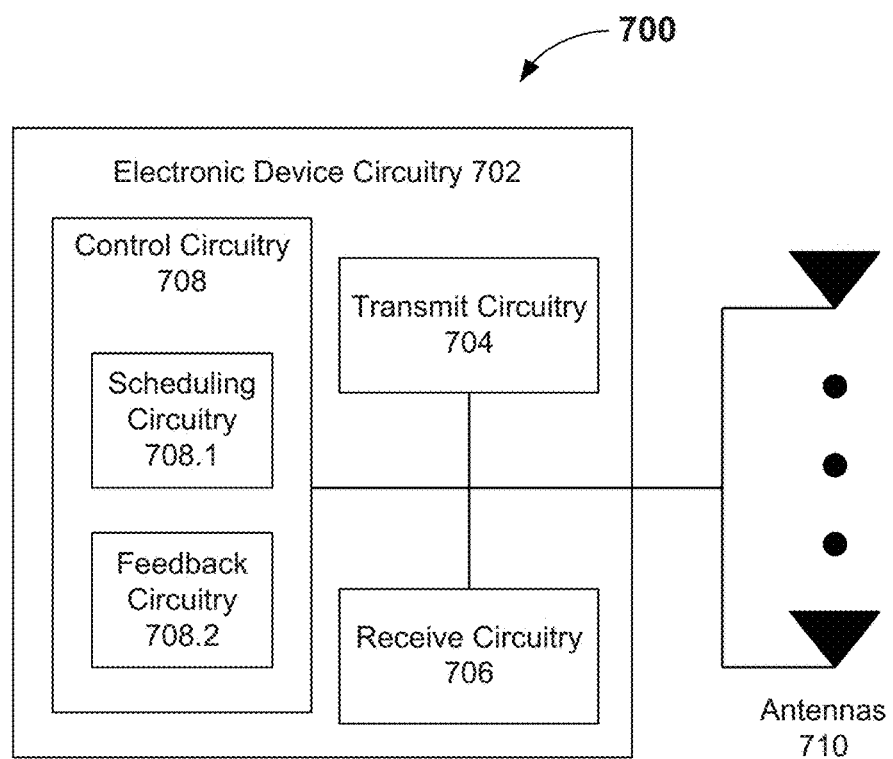
FIG. 7 illustrates a computing apparatus with electronic device circuitry including control circuitry with scheduling and feedback circuitry, transmit circuitry, and receive circuitry, in accordance with various embodiments.

FIG. 7 illustrates a computing apparatus 700 with electronic device circuitry 702 including control circuitry 708 with scheduling 708.1 and feedback 708.2 circuitry, transmit circuitry 704, and receive circuitry 706, in accordance with various embodiments. Computing apparatus 700 may be a base station such as an eNB. In embodiments, the electronic device circuitry 700 may include transmit circuitry 704 and receive circuitry 706 coupled to control circuitry 708. In embodiments, the transmit 704 and/or receive 706 circuitry may be elements or modules of transceiver circuitry, as shown. The electronic device circuitry 702 may be coupled with one or more plurality of antenna elements of one or more antennas 710. The electronic device circuitry 702 and/or the components of the electronic device circuitry 702 may be configured to perform operations similar to those described elsewhere in this disclosure. As an example, computing apparatus 700 may include scheduling circuitry 708.1 that may be to produce an enhanced physical downlink control channel (EPDCCH) transmission to be transmitted in a first subframe and a physical downlink shared channel (PDSCH) transmission to be transmitted in a second subframe, wherein the EPDCCH transmission is to schedule the PDSCH transmission and the second subframe is one or more subframes after the first subframe; and feedback circuitry 708.2 that may be to process a hybrid automatic repeat request (HARQ) transmission received from a user equipment in a third subframe that is four or more subframes after the first subframe, the HARQ transmission to correspond to the PDSCH transmission.

Figure 8:
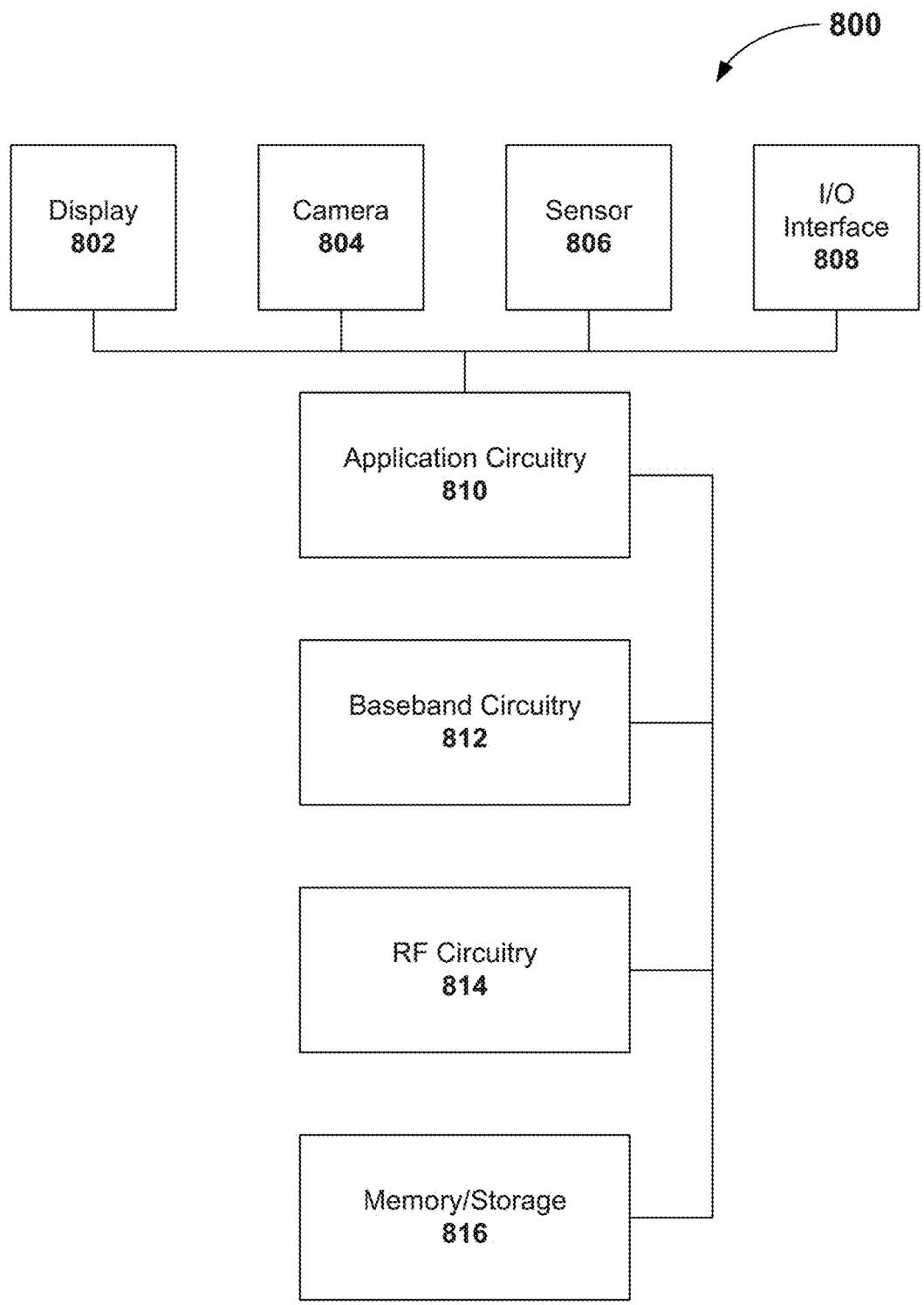
FIG. 8 illustrates, for one embodiment, an example system comprising radio frequency (RF) circuitry, baseband circuitry, application circuitry, memory/storage, display, camera, sensor, and input/output (I/O) interface, coupled with each other at least as shown, in accordance with various embodiments.

Embodiments described herein may be implemented into a system and/or a device using any suitably configured hardware and/or software. FIG. 8 illustrates, for one embodiment, an example system 800 comprising radio frequency (RF) circuitry 814, baseband circuitry 812, application circuitry 810, memory/storage 816, display 802, camera 804, sensor 806, and input/output (I/O) interface 808, coupled with each other at least as shown. Example system 800 may be a user equipment of a wireless system such as an LTE system.

The application circuitry 810 may include circuitry such as, but not limited to, one or more single-core or multi-core processors. The processor(s) may include any combination of general-purpose processors and dedicated processors (e.g., graphics processors, application processors, etc.). The processors may be coupled with memory/storage and configured to execute instructions stored in the memory/storage to enable various applications and/or operating systems running on the system.

The baseband circuitry 812 may include circuitry such as, but not limited to, one or more single-core or multi-core processors. The processor(s) may include a baseband processor. The baseband circuitry 812 may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, baseband circuitry 812 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

RF circuitry 814 may enable communication with wireless networks using modulated electromagnetic radiation through a non-solid medium. In various embodiments, the RF circuitry may include switches, filters, amplifiers, etc. to facilitate the communication with the wireless network.

In various embodiments, RF circuitry 814 may include circuitry to operate with signals that are not strictly considered as being in a radio frequency. For example, in some embodiments, RF circuitry 814 may include circuitry to operate with signals having an intermediate frequency, which is between a baseband frequency and a radio frequency.

In various embodiments, transmit circuitry 704, control circuitry 708, and/or receive circuitry 706 discussed herein may be embodied in whole or in part in one or more of the RF circuitry 814, the baseband circuitry 812, and/or the application circuitry 810. For example, the RF circuitry 814, the baseband circuitry 812, and/or the application circuitry 810 may include process circuitry to process an EPDCCH transmission in a first subframe and a PDSCH transmission in a second subframe received from an eNB, wherein the EPDCCH transmission includes a schedule for the PDSCH transmission, wherein the second subframe is one or more subframes after the first subframe; and feedback circuitry to produce a hybrid automatic repeat request feedback (HARQ) transmission to transmit in a third subframe in response to the PDSCH transmission in the second subframe, wherein the third subframe is four or more subframes after the first subframe. As another example, the RF circuitry 814, the baseband circuitry 812, and/or the application circuitry 810 may include scheduling circuitry 708.1 that may be to produce an enhanced physical downlink control channel (EPDCCH) transmission to be transmitted in a first subframe and a physical downlink shared channel (PDSCH) transmission to be transmitted in a second subframe, wherein the EPDCCH transmission is to schedule the PDSCH transmission and the second subframe is one or more subframes after the first subframe; and feedback circuitry 708.2 that may be to process a hybrid automatic repeat request (HARQ) transmission received from a user equipment in a third subframe that is four or more subframes after the first subframe, the HARQ transmission to correspond to the PDSCH transmission.

In some embodiments, some or all of the constituent components of the baseband circuitry 812, the application circuitry 810, and/or the memory/storage 816 may be implemented together on a system on a chip (SOC).

Memory/storage 816 may be used to load and store data and/or instructions, for example, for system. Memory/storage 816 for one embodiment may include any combination of suitable volatile memory (e.g., dynamic random access memory (DRAM)) and/or non-volatile memory (e.g., Flash memory).

In various embodiments, the I/O interface 808 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor 806 may include one or more sensing devices to determine environmental conditions and/or location information related to the system. In some embodiments, the sensors 806 may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 802 may include a display (e.g., a liquid crystal display, a touch screen display, etc.).

In various embodiments, the system 800 may be a mobile computing device such as, but not limited to, a laptop computing device, a tablet computing device, a netbook, an ultrabook, a smartphone, etc. In various embodiments, system may have more or less components, and/or different architectures.

EXAMPLES

According to various embodiments, the present disclosure describes control channel scheduling for wireless communications in wireless communication devices, systems, and methods.

Example 1 of a computing apparatus may comprise: scheduling circuitry to produce an enhanced physical downlink control channel (EPDCCH) transmission to be transmitted in a first subframe and a physical downlink shared channel (PDSCH) transmission to be transmitted in a second subframe, wherein the EPDCCH transmission is to schedule the PDSCH transmission and the second subframe is one or more subframes after the first subframe; and feedback circuitry to process a hybrid automatic repeat request-ACKnowledgement (HARQ-ACK) transmission received from a user equipment in a third subframe that is four or more subframes after the first subframe, the HARQ-ACK transmission to correspond to the PDSCH transmission or to the EPDCCH transmission when the EPDCCH transmission includes a downlink semi-persistent scheduling release.

Example 2 may include the subject matter of Example 1 and other examples herein, wherein: the scheduling circuitry is to produce a response EPDCCH transmission to be transmitted in a fourth subframe and a response PDSCH transmission to be transmitted in a fifth subframe, when the HARQ-ACK transmission is a NACK transmission; the fourth subframe is four or more subframes after the third subframe; and the fifth subframe is at least one subframe after the fourth subframe.

Example 3 may include the subject matter of Example 1 and other examples herein, wherein the scheduling circuitry is to produce up to two additional EPDCCH transmissions to be transmitted after the first subframe and up to two additional PDSCH transmissions respectively corresponding to the up to two additional EPDCCH transmissions and to be transmitted after the second subframe; the feedback circuitry is to process up to two additional HARQ transmissions received from the user equipment after the third subframe; and the first, second, and third subframes, and subframes with the up to two additional EPDCCH transmissions, the up to two additional PDSCH transmissions, and the up to two additional HARQ transmissions, are in the same radio frame.

Example 4 of a computing apparatus may comprise: scheduling circuitry to produce an enhanced physical downlink control channel (EPDCCH) transmission and a physical downlink shared channel (PDSCH) transmission, wherein the EPDCCH transmission is to schedule the PDSCH transmission one or more subframes after the EPDCCH transmission; and transmitter circuitry coupled to the scheduling circuitry, the transmitter circuitry to transmit the EPDCCH transmission in a first subframe and the PDSCH transmission in a second subframe.

Example 5 may include the subject matter of Example 4 and other examples herein, wherein the PDSCH transmission carries System Information Block type x (SIBx) and x is 1 or greater and when x is 1, SIB1 is in subframe 4 or 5 of a radio frame.

Example 6 may include the subject matter of Example 5 and other examples herein, wherein the SIB1 contains time-domain scheduling information that identifies at least one subframe with a subsequent EPDCCH transmission, wherein the subsequent EPDCCH transmission schedules a subsequent PDSCH transmission with SIBy, wherein y is two or greater, wherein the subsequent PDSCH transmission is in a subframe adjacent to the subframe with the subsequent EPDCCH transmission.

Example 7 may include the subject matter of Example 6 and other examples herein, wherein the SIB1 contains a system information window (SI-window) to transmit the SIBy, wherein the computing apparatus transmits the subsequent EPDCCH transmission in a subframe before the SI-window.

Example 8 may include the subject matter of Example 7 and other examples herein, wherein the subsequent PDSCH transmission is transmitted by the computing apparatus k subframes after the subsequent EPDCCH transmission, wherein k is less than 3.

Example 9 may include the subject matter of Example 8 and other examples herein, wherein k is included in a master information block (MIB) transmitted by the computing apparatus.

Example 10 may include the subject matter of Example 4 and other examples herein, wherein the PDSCH transmission carries a paging message.

Example 11 may include the subject matter of Example 10 and other examples herein, wherein the EPDCCH transmission is before a paging occasion.

Example 12 may include the subject matter of Example 10 and other examples herein, wherein the EPDCCH transmission is before a paging occasion and the PDSCH transmission is during the paging occasion.

Example 13 may include the subject matter of Example 12 and other examples herein, wherein the number of subframes between the EPDCCH transmission and the PDSCH transmission is indicated in a master information block.

Example 14 may include the subject matter of Example 12 and other examples herein, wherein the number of subframes between the EPDCCH transmission and the PDSCH transmission is provided by the EPDCCH transmission.

Example 15 may include the subject matter of Example 12 and other examples herein, wherein the number of subframes between the EPDCCH transmission and the PDSCH transmission is zero or one.

Example 16 may include the subject matter of any one of Examples 1-15 and other examples herein, wherein the computing apparatus transmits and receives in a 1.4 MHz bandwidth of a long term evolution system and the user equipment is a half-duplex frequency division duplex machine type communication user equipment.

Example 17 of a computing apparatus may comprise: scheduling circuitry to produce an enhanced physical downlink control channel (EPDCCH) transmission to be transmitted in a first subframe, wherein the EPDCCH transmission includes a downlink semi-persistent scheduling release; and feedback circuitry to process a hybrid automatic repeat request-ACKnowledgement (HARQ-ACK) transmission received from a user equipment in a third subframe that is four or more subframes after the first subframe, the HARQ-ACK transmission to correspond to the downlink semi-persistent scheduling release.

Example 18 may include the subject matter of Example 17 and other examples herein, wherein the scheduling circuitry is to schedule transmissions and the feedback circuitry is to process received transmissions in a 1.4 MHz bandwidth of a long term evolution system and the user equipment is a half-duplex frequency division duplex machine type communication user equipment.

Example 19 of a method in a computing apparatus may comprise: scheduling, by the computing apparatus, an enhanced physical downlink control channel (EPDCCH) transmission and a physical downlink shared channel (PDSCH) transmission, wherein the EPDCCH transmission includes scheduling information for the PDSCH transmission; transmitting, by the computing apparatus, the EPDCCH transmission in a first subframe and the PDSCH transmission in a second subframe, wherein the second subframe is one or more subframes after the first subframe; and receiving, by the computing apparatus, a hybrid automatic repeat request-ACKnowledgement (HARQ-ACK) transmission in a third subframe from a user equipment in response to the PDSCH transmission or to the EPDCCH transmission when the EPDCCH transmission includes a downlink semi-persistent scheduling release, wherein the third subframe is four or more subframes after the first subframe.

Example 20 may include the subject matter of Example 19 and other examples herein, further comprising: scheduling, by the computing apparatus, a response EPDCCH transmission and a response PDSCH transmission, wherein the response EPDCCH transmission includes scheduling information for the response PDSCH transmission, wherein the response EPDCCH transmission and the response PDSCH transmission are scheduled at least in part in response to when the HARQ-ACK transmission is a NACK; and transmitting, by the computing apparatus, the response EPDCCH transmission in a fourth subframe and the PDSCH transmission in a fifth subframe, wherein the fifth subframe is one or more subframes after the fourth subframe, wherein the fourth subframe is four or more subframes after the third subframe.

Example 21 may include the subject matter of Example 19 and other examples herein, further comprising: producing, by the computing apparatus, up to two additional EPDCCH transmissions to be transmitted after the first subframe and up to two additional PDSCH transmissions respectively corresponding to the up to two additional EPDCCH transmissions and to be transmitted after the second subframe; and receiving, by the computing apparatus, up to two additional HARQ-ACK transmissions from the user equipment after the third subframe, wherein the first, second, and third subframes, and subframes with the up to two additional EPDCCH transmissions, the up to two additional PDSCH transmissions, and the up to two additional HARQ-ACK transmissions, are in the same radio frame.

Example 22 of a method in a computing apparatus may comprise: scheduling, by the computing apparatus, an enhanced physical downlink control channel (EPDCCH) transmission and a physical downlink shared channel (PDSCH) transmission, wherein the EPDCCH transmission includes scheduling information for the PDSCH transmission; and transmitting, by the computing apparatus, the EPDCCH transmission in a first subframe and the PDSCH transmission in a second subframe, wherein the second subframe is one or more subframes after the first subframe.

Example 23 may include the subject matter of Example 22 and other examples herein, wherein the PDSCH transmission carries System Information Block type x (SIBx) and x is 1 or greater and when x is 1, SIB1 is in subframe 4 or 5 of the radio frame.

Example 24 may include the subject matter of Example 23 and other examples herein, wherein the SIB1 contains time-domain scheduling information that identifies at least one subframe with a subsequent EPDCCH transmission, wherein the subsequent EPDCCH transmission includes scheduling for a subsequent PDSCH transmission with SIBy, wherein y is two or greater, wherein the subsequent PDSCH transmission is in a subframe adjacent to the subframe with the subsequent EPDCCH transmission.

Example 25 may include the subject matter of Example 24 and other examples herein, wherein the SIB1 contains a system information window (SI-window) for transmission of the SIBy, wherein the computing apparatus transmits the subsequent EPDCCH transmission in a subframe before the SI-window.

Example 26 may include the subject matter of Example 25 and other examples herein, wherein the subsequent PDSCH transmission is transmitted by the computing apparatus k subframes after the subsequent EPDCCH transmission, wherein k is less than 3.

Example 27 may include the subject matter of Example 26 and other examples herein, wherein k is included in a master information block (MIB) transmitted by the computing apparatus.

Example 28 may include the subject matter of Example 22 and other examples herein, wherein the PDSCH transmission carries a paging message.

Example 29 may include the subject matter of Example 28 and other examples herein, wherein the computing apparatus transmits the EPDCCH transmission before a paging occasion.

Example 30 may include the subject matter of Example 28 and other examples herein, wherein the computing apparatus transmits the EPDCCH transmission before a paging occasion and transmits the PDSCH transmission during the paging occasion.

Example 31 may include the subject matter of Example 30 and other examples herein, wherein the number of subframes between the EPDCCH transmission and the PDSCH transmission is indicated in a master information block.

Example 32 may include the subject matter of Example 30 and other examples herein, wherein the number of subframes between the EPDCCH transmission and the PDSCH transmission is provided by the EPDCCH transmission.

Example 33 may include the subject matter of Example 30 and other examples herein, wherein the number of subframes between the EPDCCH transmission and the PDSCH transmission is zero or one.

Example 34 may include the subject matter of any one of Examples 19-33 and other examples herein, wherein the computing apparatus is scheduling, transmitting, and receiving in a 1.4 MHz bandwidth of a long term evolution system and the user equipment is a half-duplex frequency division duplex machine type communication user equipment.

Example 35 of a method in a computing apparatus may comprise: scheduling, by the computing apparatus, an enhanced physical downlink control channel (EPDCCH) transmission with a downlink semi-persistent scheduling release; transmitting, by the computing apparatus, the EPDCCH transmission in a first subframe; and receiving, by the computing apparatus, a hybrid automatic repeat request-ACKnowledgement (HARQ-ACK) transmission in a second subframe from a user equipment in response to the downlink semi-persistent scheduling release, wherein the second subframe is four or more subframes after the first subframe.

Example 36 may include the subject matter of Example 35 and other examples herein, wherein the scheduling, transmitting, and receiving is in a 1.4 MHz bandwidth of a long term evolution system and the user equipment is a half-duplex frequency division duplex machine type communication user equipment.

Example 37 of a non-transitory computer readable media may comprise one or more non-transitory computer readable media comprising instructions to cause a computing apparatus, in response to execution of the instructions by a processor of the computing apparatus, to: schedule an enhanced physical downlink control channel (EPDCCH) transmission with scheduling information for a physical downlink shared channel (PDSCH) transmission scheduled one or more subframes after the EPDCCH transmission; transmit the EPDCCH transmission in a first subframe and the PDSCH transmission in a second subframe; and receive a hybrid automatic repeat request-ACKnowledgement (HARQ-ACK) transmission from a user equipment in response to the PDSCH transmission or in response to a downlink semi-persistent schedule release in the EPDCCH transmission, wherein the HARQ-ACK transmission is four or more subframes after the EPDCCH transmission.

Example 38 may include the subject matter of Example 37 and other examples herein, further comprising: transmit a response EPDCCH transmission four or more subframes after the HARQ-ACK transmission, wherein the response EPDCCH transmission includes a schedule of a response PDSCH transmission that is scheduled at least one subframe after the response EPDCCH transmission.

Example 39 may include the subject matter of Example 37 and other examples herein, further comprising: perform up to three HARQ processes, wherein a HARQ process is comprised of transmit the EPDCCH transmission and the PDSCH transmission, and receive the HARQ-ACK transmission.

Example 40 of a non-transitory computer readable media may comprise one or more non-transitory computer readable media comprising instructions to cause a computing apparatus, in response to execution of the instructions by a processor of the computing apparatus, to: schedule an enhanced physical downlink control channel (EPDCCH) transmission with scheduling information for a physical downlink shared channel (PDSCH) transmission scheduled one or more subframes after the EPDCCH transmission; and transmit the EPDCCH transmission and the PDSCH transmission in subframes.

Example 41 may include the subject matter of Example 40 and other examples herein, wherein the PDSCH transmission carries System Information Block type x (SIBx) and x is 1 or greater and when x is 1, SIB1 is in subframe 4 or 5 of the radio frame.

Example 42 may include the subject matter of Example 41 and other examples herein, wherein the SIB1 contains time-domain scheduling information that identifies at least one subframe with a subsequent EPDCCH transmission, wherein the subsequent EPDCCH transmission schedules a subsequent PDSCH transmission with SIBy, wherein y is two or greater, wherein the subsequent PDSCH transmission is in a subframe adjacent to the subframe with the subsequent EPDCCH transmission.

Example 43 may include the subject matter of Example 42 and other examples herein, wherein the SIB1 contains a system information window (SI-window) for transmission of the SIBy, wherein the computing apparatus transmits the subsequent EPDCCH transmission in a subframe before the SI-window.

Example 44 may include the subject matter of Example 43 and other examples herein, wherein the subsequent PDSCH transmission is transmitted by the computing apparatus k subframes after the subsequent EPDCCH transmission, wherein k is less than 3.

Example 45 may include the subject matter of Example 44 and other examples herein, wherein k is included in a master information block (MIB) transmitted by the computing apparatus.

Example 46 may include the subject matter of Example 40 and other examples herein, wherein the PDSCH transmission includes a paging message.

Example 47 may include the subject matter of Example 46 and other examples herein, wherein the EPDCCH transmission is transmitted before a paging occasion.

Example 48 may include the subject matter of Example 46 and other examples herein, wherein the EPDCCH transmission is transmitted before a paging occasion and the PDSCH transmission is transmitted during the paging occasion.

Example 49 may include the subject matter of Example 48 and other examples herein, wherein the number of subframes between the EPDCCH transmission and the PDSCH transmission is indicated in a master information block.

Example 50 may include the subject matter of Example 48 and other examples herein, wherein the number of subframes between the EPDCCH transmission and the PDSCH transmission is provided by the EPDCCH transmission.

Example 51 may include the subject matter of Example 48 and other examples herein, wherein the number of subframes between the EPDCCH transmission and the PDSCH transmission is zero or one.

Example 52 may include the subject matter of any one of Examples 37-51 and other examples herein, wherein the media further comprises instructions to cause a computing apparatus, in response to execution of the instructions by a processor of the computing apparatus, to: schedule, transmit, and receive in a 1.4 MHz bandwidth of a long term evolution system and the UE is a half-duplex frequency division duplex machine type communication user equipment.

Example 53 of a non-transitory computer readable media may comprise one or more non-transitory computer readable media comprising instructions to cause a computing apparatus, in response to execution of the instructions by a processor of the computing apparatus, to: schedule an enhanced physical downlink control channel (EPDCCH) transmission with a downlink semi-persistent scheduling release; transmit the EPDCCH transmission in a first subframe; and receive a hybrid automatic repeat request-ACKnowledgement (HARQ-ACK) transmission in a second subframe from a user equipment in response to the downlink semi-persistent scheduling release, wherein the second subframe is four or more subframes after the first subframe.

Example 54 may include the subject matter of Example 53 and other examples herein, wherein the media further comprises instructions to cause a computing apparatus, in response to execution of the instructions by a processor of the computing apparatus, to: schedule, transmit, and receive in a 1.4 MHz bandwidth of a long term evolution system and the UE is a half-duplex frequency division duplex machine type communication user equipment.

Example 55 of a computing apparatus may comprise: process circuitry to process an EPDCCH transmission and a PDSCH transmission received from an eNB, wherein the EPDCCH transmission includes a schedule for the PDSCH transmission, wherein the PDSCH transmission is one or more subframes after the EPDCCH transmission; and feedback circuitry to produce a hybrid automatic repeat request-ACKnowledgement (HARQ-ACK) transmission in response to the PDSCH transmission or a downlink semi-persistent schedule release in the EPOCH transmission, wherein the HARQ-ACK transmission is four or more subframes after the EPDCCH transmission.

Example 56 may include the subject matter of Example 55 and other examples herein, wherein the process circuitry is to process a response EPDCCH transmission, wherein the response EPDCCH transmission includes a schedule for a response PDSCH transmission at least one subframe after the response EPDCCH transmission.

Example 57 may include the subject matter of Example 55 and other examples herein, wherein the process circuitry is to process up to two additional EPDCCH transmissions and up to two additional PDSCH transmissions respectively corresponding to the up to two additional EPDCCH transmissions, wherein the feedback circuitry is to produce up to two additional HARQ-ACK transmissions to be transmitted from the user equipment, wherein the up to two additional EPDCCH transmissions, the up to two additional PDSCH transmissions, and the up to two additional HARQ-ACK transmissions, are in the same radio frame.

Example 58 of a computing apparatus may comprise: receive circuitry to receive an EPDCCH transmission and a PDSCH transmission received from an eNB, wherein the EPDCCH transmission includes a schedule for the PDSCH transmission, wherein the PDSCH transmission is one or more subframes after the EPDCCH transmission; and process circuitry coupled to the receive circuitry, the process circuitry to process the EPDCCH transmission and the PDSCH transmission received from the eNB.

Example 59 may include the subject matter of Example 58 and other examples herein, wherein the PDSCH transmission carries System Information Block type x (SIBx) and x is 1 or greater and when x is 1, SIB1 is in subframe 4 or 5 of a radio frame, wherein the radio frame includes the subframes with the EPDCCH transmission and the PDSCH transmission.

Example 60 may include the subject matter of Example 59 and other examples herein, wherein the SIB1 contains time-domain scheduling information that identifies at least one subframe with a subsequent EPDCCH transmission, wherein the subsequent EPDCCH transmission includes a schedule of a subsequent PDSCH transmission with SIBy, wherein y is two or greater, wherein the subsequent PDSCH transmission is in a subframe adjacent to the subframe with the subsequent EPDCCH transmission.

Example 61 may include the subject matter of Example 60 and other examples herein, wherein the SIB1 contains a system information window (SI-window) to receive the SIBy, wherein the computing apparatus receives the subsequent EPDCCH transmission in a subframe before the SI-window.

Example 62 may include the subject matter of Example 61 and other examples herein, wherein the subsequent PDSCH transmission is received by the computing apparatus k subframes after the subsequent EPDCCH transmission, wherein k is less than 3.

Example 63 may include the subject matter of Example 62 and other examples herein, wherein k is included in a master information block (MIB) transmitted by the computing apparatus.

Example 64 may include the subject matter of Example 58 and other examples herein, wherein the PDSCH transmission carries a paging message.

Example 65 may include the subject matter of Example 64 and other examples herein, wherein the EPDCCH transmission is received before a paging occasion.

Example 66 may include the subject matter of Example 64 and other examples herein, wherein the EPDCCH transmission is received before a paging occasion and the PDSCH transmission is received during the paging occasion.

Example 67 may include the subject matter of Example 66 and other examples herein, wherein the number of subframes between the EPDCCH transmission and the PDSCH transmission is indicated in a master information block.

Example 68 may include the subject matter of Example 66 and other examples herein, wherein the number of subframes between the EPDCCH transmission and the PDSCH transmission is provided by the EPDCCH transmission.

Example 69 may include the subject matter of Example 66 and other examples herein, wherein the number of subframes between the EPDCCH transmission and the PDSCH transmission is zero or one.

Example 70 may include the subject matter of any one of Examples 55-69 and other examples herein, wherein the computing apparatus is a half-duplex frequency division duplex machine type communication user equipment that receives and transmits in a 1.4 MHz bandwidth of a long term evolution system.

Example 71 of a computing apparatus may comprise: a receiver to receive from an eNB in a first subframe an EPDCCH transmission with a downlink semi-persistent scheduling release; and a transmitter to transmit a hybrid automatic repeat request-ACKnowledgement (HARQ-ACK) transmission in a second subframe in response to the EPDCCH transmission with the downlink semi-persistent scheduling release, wherein the second subframe is four or more subframes after the first subframe.

Example 72 of a computing apparatus may comprise: process circuitry to process an EPDCCH transmission with a downlink semi-persistent scheduling release in a first subframe received from an eNB; and feedback circuitry to produce a hybrid automatic repeat request-ACKnowledgement (HARQ-ACK) transmission to transmit in a second subframe in response to the downlink semi-persistent scheduling release, wherein the second subframe is four or more subframes after the first subframe.

Example 73 may include the subject matter of Example 72 and other examples herein, wherein the computing apparatus is a half-duplex frequency division duplex machine type communication user equipment that receives and transmits in a 1.4 MHz bandwidth of a long term evolution system.

Example 74 may comprise a computing apparatus with means to perform any of the methods recited in Examples 19 to 36.

Example 75 is one or more non-transitory computer readable media comprising instructions to cause a computing apparatus, in response to execution of the instructions by a processor of the computing apparatus, to: produce and schedule an enhanced physical downlink control channel (EPDCCH) transmission in a first subframe and a physical downlink shared channel (PDSCH) transmission in a second subframe scheduled one or more subframes after the first subframe, the EPDCCH transmission including scheduling of the PDSCH transmission; transmit the EPDCCH and PDSCH transmissions in respective subframes; and receive a hybrid automatic repeat request-ACKnowledgement (HARQ-ACK) transmission in a third subframe from a machine type communication user equipment (MTC UE) in response to the PDSCH transmission, wherein the third subframe is four or more subframes after first subframe.

Example 76 may include the subject matter of Example 75 and other examples herein, wherein the MTC UE is a half-duplex frequency division duplex MTC UE that receives and transmits in a 1.4 MHz bandwidth of a long term evolution system.

Example 77 may include the subject matter of Example 75 and other examples herein, wherein the instructions are further to cause the computing apparatus to: transmit a response EPDCCH transmission four or more subframes after the HARQ-ACK transmission, wherein the response EPDCCH transmission includes a schedule of a response PDSCH transmission that is scheduled at least one subframe after the response EPDCCH transmission.

Example 78 may include the subject matter of Example 75 and other examples herein, wherein the instructions are further to cause the computing apparatus to: perform up to three HARQ processes, wherein a HARQ process is comprised of transmit the EPDCCH transmission and the PDSCH transmission, and receive the HARQ-ACK transmission.

Example 79 is one or more non-transitory computer readable media comprising instructions to cause a computing apparatus, in response to execution of the instructions by a processor of the computing apparatus, to: produce an enhanced physical downlink control channel (EPDCCH) transmission and a physical downlink shared channel (PDSCH) transmission, wherein the EPDCCH transmission includes scheduling information of the PDSCH transmission, wherein the PDSCH transmission includes a paging message; schedule the EPDCCH transmission in a first subframe and the PDSCH transmission in a second subframe scheduled one or more subframes after the first subframe; and transmit the EPDCCH and PDSCH transmissions in respective subframes; receive a hybrid automatic repeat request-ACKnowledgement (HARQ-ACK) transmission in a third subframe from a user equipment (UE) in response to the PDSCH transmission, wherein the third subframe is four or more subframes after first subframe.

Example 80 may include the subject matter of Example 79 and other examples herein, wherein the instructions are further to cause the computing apparatus to: transmit, in response to when the HARQ-ACK transmission is a NACK, a response EPDCCH transmission four or more subframes after the HARQ-ACK transmission, wherein the response EPDCCH transmission includes a schedule of a response PDSCH transmission that is scheduled at least one subframe after the response EPDCCH transmission.

Example 81 may include the subject matter of Example 79 and other examples herein, wherein the EPDCCH transmission is transmitted before a paging occasion.

Example 82 may include the subject matter of Example 79 and other examples herein, wherein the EPDCCH transmission is transmitted before a paging occasion and the PDSCH transmission is transmitted during the paging occasion.

Example 83 may include the subject matter of Example 82 and other examples herein, wherein the number of subframes between the EPDCCH transmission and the PDSCH transmission is indicated in a master information block.

Example 84 may include the subject matter of Example 82 and other examples herein, wherein the number of subframes between the EPDCCH transmission and the PDSCH transmission is provided by the EPDCCH transmission.

Example 85 may include the subject matter of Example 82 and other examples herein, wherein the number of subframes between the EPDCCH transmission and the PDSCH transmission is zero or one.

Example 86 may include the subject matter of Example 79 and other examples herein, wherein the media further comprises instructions to cause a computing apparatus, in response to execution of the instructions by a processor of the computing apparatus, to: schedule, transmit, and receive in a 1.4 MHz bandwidth of a long term evolution system.

Example 87 may include the subject matter of Example 79 and other examples herein, wherein the UE is a half-duplex frequency division duplex machine type communication user equipment that transmits and receives in a 1.4 MHz bandwidth of a long term evolution system.

Example 88 of a computing apparatus may comprise: schedule means for scheduling an enhanced physical downlink control channel (EPDCCH) transmission and a physical downlink shared channel (PDSCH) transmission, wherein the EPDCCH transmission includes scheduling information for the PDSCH transmission; and transmit means for transmitting the EPDCCH transmission in a first subframe and the PDSCH transmission in a second subframe, wherein the second subframe is one or more subframes after the first subframe.

Example 89 may include the subject matter of Example 88 and other examples herein, wherein the PDSCH transmission carries System Information Block type x (SIBx) and x is 1 or greater and when x is 1, SIB1 is in subframe 4 or 5 of the radio frame.

Example 90 may include the subject matter of Example 89 and other examples herein, wherein the SIB1 contains time-domain scheduling information that identifies at least one subframe with a subsequent EPDCCH transmission, wherein the subsequent EPDCCH transmission includes scheduling for a subsequent PDSCH transmission with SIBy, wherein y is two or greater, wherein the subsequent PDSCH transmission is in a subframe adjacent to the subframe with the subsequent EPDCCH transmission.

Example 91 may include the subject matter of Example 90 and other examples herein, wherein the SIB1 contains a system information window (SI-window) for transmission of the SIBy, wherein the computing apparatus transmits the subsequent EPDCCH transmission in a subframe before the SI-window.

Example 92 may include the subject matter of Example 91 and other examples herein, wherein the subsequent PDSCH transmission is transmitted by the computing apparatus k subframes after the subsequent EPDCCH transmission, wherein k is less than 3.

Example 93 may include the subject matter of Example 92 and other examples herein, wherein k is included in a master information block (MIB) transmitted by the computing apparatus.

Example 94 may include the subject matter of Example 88 and other examples herein, wherein the PDSCH transmission carries a paging message.

Example 95 may include the subject matter of Example 94 and other examples herein, wherein the computing apparatus has means for transmitting the EPDCCH transmission before a paging occasion.

Example 96 may include the subject matter of Example 94 and other examples herein, wherein the computing apparatus has means for transmitting the EPDCCH transmission before a paging occasion and transmits the PDSCH transmission during the paging occasion.

Example 97 may include the subject matter of Example 96 and other examples herein, wherein the number of subframes between the EPDCCH transmission and the PDSCH transmission is indicated in a master information block.

Example 98 may include the subject matter of Example 96 and other examples herein 6, wherein the number of subframes between the EPDCCH transmission and the PDSCH transmission is provided by the EPDCCH transmission.

Example 99 may include the subject matter of Example 96 and other examples herein, wherein the number of subframes between the EPDCCH transmission and the PDSCH transmission is zero or one.

Example 100 may include the subject matter of any one of Examples 88-99 and other examples herein, wherein the computing apparatus has means for scheduling, transmitting, and receiving in a 1.4 MHz bandwidth of a long term evolution system.

Example 101 may be a computing apparatus comprising: scheduling circuitry to produce an enhanced physical downlink control channel (EPDCCH) transmission to be transmitted in a first subframe and a physical downlink shared channel (PDSCH) transmission to be transmitted in a second subframe, wherein the EPDCCH transmission is to schedule the PDSCH transmission and the second subframe is one or more subframes after the first subframe; and transmitter circuitry coupled to the scheduling circuitry, the transmitter circuitry to transmit the EPDCCH transmission in the first subframe and the PDSCH transmission in the second subframe.

Example 102 may include the subject matter of Example 101 and other examples herein, further comprising: feedback circuitry to process a hybrid automatic repeat request-ACKnowledgement (HARQ-ACK) transmission received from a user equipment in a third subframe that is four or more subframes after the first subframe, the HARQ-ACK transmission to correspond to the PDSCH transmission or to the EPDCCH transmission when the EPDCCH transmission includes a downlink semi-persistent scheduling release.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

What is claimed is:
1. A computing apparatus comprising:
scheduling circuitry to produce an enhanced physical downlink control channel (EPDCCH) transmission to be transmitted in a first subframe and a physical downlink shared channel (PDSCH) transmission to be transmitted in a second subframe, wherein the EPDCCH transmission is to schedule the PDSCH transmission and the second subframe is one or more subframes after the first subframe; and
feedback circuitry to process a hybrid automatic repeat request-ACKnowledgement (HARQ- ACK) transmission received from a user equipment in a third subframe that is four or more subframes after the first subframe, the HARQ-ACK transmission to correspond to the PDSCH transmission or to the EPDCCH transmission when the EPDCCH transmission includes a downlink semi-persistent scheduling release, wherein:
the scheduling circuitry is to produce a response EPDCCH transmission to be transmitted in a fourth subframe and a response PDSCH transmission to be transmitted in a fifth subframe, when the HARQ-ACK transmission is a negative acknowledgement (NACK) transmission;

the fourth subframe is four or more subframes after the third subframe; and the fifth subframe is at least one subframe after the fourth subframe.

2. The computing apparatus of claim 1, wherein the PDSCH transmission carries a paging message.

3. The computing apparatus of claim 2, wherein the EPDCCH transmission is before a paging occasion.

4. The computing apparatus of claim 2, wherein the EPDCCH transmission is before a paging occasion and the PDSCH transmission is during the paging occasion.

5. The computing apparatus of claim 4, wherein a number of subframes between the EPDCCH transmission and the PDSCH transmission is indicated in a master information block.

6. A computing apparatus comprising:

scheduling circuitry to produce an enhanced physical downlink control channel (EPDCCH) transmission to be transmitted in a first subframe and a physical downlink shared channel (PDSCH) transmission to be transmitted in a second subframe, wherein the EPDCCH transmission is to schedule the PDSCH transmission and the second subframe is one or more subframes after the first subframe; and feedback circuitry to process a hybrid automatic repeat request-ACKnowledgement (HARQ-ACK) transmission received from a user equipment in a third subframe that is four or more subframes after the first subframe, the HARQ-ACK transmission to correspond to the PDSCH transmission or to the EPDCCH transmission when the EPDCCH transmission includes a downlink semi-persistent scheduling release, wherein:

the scheduling circuitry is to produce up to two additional EPDCCH transmissions to be transmitted after the first subframe and up to two additional PDSCH transmissions respectively corresponding to the up to two additional EPDCCH transmissions and to be transmitted after the second subframe;

the feedback circuitry is to process up to two additional HARQ-ACK transmissions received from the user equipment after the third subframe; and the first, second, and third subframes, and subframes with the up to two additional EPDCCH transmissions, the up to two additional PDSCH transmissions, and the up to two additional HARQ-ACK transmissions, are in a same radio frame.

7. A computing apparatus comprising:

scheduling circuitry to produce an enhanced physical downlink control channel (EPDCCH) transmission and a physical downlink shared channel (PDSCH) transmission, wherein the EPDCCH transmission is to schedule the PDSCH transmission one or more subframes after the EPDCCH transmission, wherein the PDSCH transmission carries System Information Block type x (SIBx) and x is 1 or greater and when x is 1, SIB1 is in subframe 4 or 5 of a radio frame, and wherein the SIB1 contains time-domain scheduling information that identifies at least one subframe with a subsequent EPDCCH transmission, wherein the subsequent EPDCCH transmission schedules a subsequent PDSCH transmission with SIBy, wherein y is two or greater, wherein the subsequent PDSCH transmission is in a subframe adjacent to the subframe with the subsequent EPDCCH transmission; and transmitter circuitry coupled to the scheduling circuitry, the transmitter circuitry to transmit the EPDCCH transmission in a first subframe and the PDSCH transmission in a second subframe.

8. The computing apparatus of claim 7, wherein the SIB1 contains a system information window (SI-window) to transmit the SIBy, wherein the computing apparatus transmits the subsequent EPDCCH transmission in a subframe before the SI-window.

9. The computing apparatus of claim 8, wherein the subsequent PDSCH transmission is transmitted by the computing apparatus k subframes after the subsequent EPDCCH transmission, wherein k is less than 3.

10. One or more non-transitory computer readable media comprising instructions to cause a computing apparatus, in response to execution of the instructions by a processor of the computing apparatus, to:

produce and schedule an enhanced physical downlink control channel (EPDCCH) transmission in a first subframe and a physical downlink shared channel (PDSCH) transmission in a second subframe scheduled one or more subframes after the first subframe, the EPDCCH transmission including scheduling of the PDSCH transmission;

transmit the EPDCCH and PDSCH transmissions in respective subframes;

receive a hybrid automatic repeat request-ACKnowledgement (HARQ-ACK) transmission in a third subframe from a machine type communication user equipment (MTC UE) in response to the PDSCH transmission, wherein the third subframe is four or more subframes after the first subframe; and transmit a response EPDCCH transmission four or more subframes after the HARQ-ACK transmission, when the HARQ-ACK transmission is a negative acknowledgement (NACK) transmission, wherein the response EPDCCH transmission includes a schedule of a response PDSCH transmission that is scheduled at least one subframe after the response EPDCCH transmission.

11. The non-transitory computer readable media of claim 10, wherein the MTC UE is a half-duplex frequency division duplex MTC UE that receives and transmits in a 1.4 MHz bandwidth of a long term evolution system.

12. One or more non-transitory computer readable media comprising instructions to cause a computing apparatus, in response to execution of the instructions by a processor of the computing apparatus, to:

produce an enhanced physical downlink control channel (EPDCCH) transmission and a physical downlink shared channel (PDSCH) transmission, wherein the EPDCCH transmission includes scheduling information of the PDSCH transmission, wherein the PDSCH transmission includes a paging message;

schedule the EPDCCH transmission in a first subframe and the PDSCH transmission in a second subframe scheduled one or more subframes after the first subframe;

transmit the EPDCCH and PDSCH transmissions in respective subframes;

receive a hybrid automatic repeat request-ACKnowledgement (HARQ-ACK) transmission in a third subframe from a user equipment (UE) in response to the PDSCH transmission, wherein the third subframe is four or more subframes after first subframe; and transmit, in response to when the HARQ-ACK transmission is a negative acknowledgement (NACK), a response EPDCCH transmission four or more subframes after the HARQ-ACK transmission, wherein the response EPDCCH transmission includes a schedule of a response PDSCH transmission that is scheduled at least one subframe after the response EPDCCH transmission.

13. The non-transitory computer readable media of claim 12, wherein the EPDCCH transmission is transmitted before a paging occasion.

14. The non-transitory computer readable media of claim 12, wherein the EPDCCH transmission is transmitted before a paging occasion and the PDSCH transmission is transmitted during the paging occasion.

15. The non-transitory computer readable media of claim 14, wherein a number of subframes between the EPDCCH transmission and the PDSCH transmission is indicated in a master information block.

16. The non-transitory computer readable media of claim 14, wherein a number of subframes between the EPDCCH transmission and the PDSCH transmission is provided by the EPDCCH transmission.

17. The non-transitory computer readable media of claim 14, wherein a number of subframes between the EPDCCH transmission and the PDSCH transmission is zero or one.

18. The non-transitory computer readable media of claim 12, wherein the media further comprises instructions to cause a computing apparatus, in response to execution of the instructions by a processor of the computing apparatus, to: schedule, transmit, and receive in a 1.4 MHz bandwidth of a long term evolution system.

19. The non-transitory computer readable media of claim 12, wherein the UE is a half-duplex frequency division duplex machine type communication user equipment that transmits and receives in a 1.4 MHz bandwidth of a long term evolution system.

20. One or more non-transitory computer readable media comprising instructions to cause a computing apparatus, in response to execution of the instructions by a processor of the computing apparatus, to:
  produce and schedule an enhanced physical downlink control channel (EPDCCH) transmission in a first subframe and a physical downlink shared channel (PDSCH) transmission in a second subframe scheduled one or more subframes after the first subframe, the EPDCCH transmission including scheduling of the PDSCH transmission;
  transmit the EPDCCH and PDSCH transmissions in respective subframes;
    receive a hybrid automatic repeat request-ACKnowledgement (HARQ-ACK) transmission in a third subframe from a machine type communication user equipment (MTC UE) in response to the PDSCH transmission, wherein the third subframe is four or more subframes after first subframe;
  produce and schedule up to two additional EPDCCH transmissions to be transmitted after the first subframe and up to two additional PDSCH transmissions respectively corresponding to the up to two additional EPDCCH transmissions and to be transmitted after the second subframe; and
  receive up to two additional HARQ-ACK transmissions received from the user equipment after the third subframe, wherein:
  the first, second, and third subframes, and subframes with the up to two additional EPDCCH transmissions, the up to two additional PDSCH transmissions, and the up to two additional HARQ-ACK transmissions, are in a same radio frame.

21. The non-transitory computer readable media of claim 20, wherein the MTC UE is a half-duplex frequency division duplex MTC UE that receives and transmits in a 1.4 MHz bandwidth of a long term evolution system.

* * * * *

UNITED STATES PATENT AND TRADEMARK OFFICE
CERTIFICATE OF CORRECTION

PATENT NO. : 9,800,387 B2
APPLICATION NO. : 14/711701
DATED : October 24, 2017
INVENTOR(S) : Gang Xiong et al.

It is certified that error appears in the above-identified patent and that said Letters Patent is hereby corrected as shown below:

In the Claims

Column 22
Line 62, delete the space after the hyphen --HARQ- -- and in front of --ACK--

Column 24
Line 65, replace "after first subframe" with --after the first subframe--

Signed and Sealed this
Twenty-second Day of May, 2018

Andrei Iancu
*Director of the United States Patent and Trademark Office*